(No Model.)
J. C. ANDERSON.
BRICK OR TILE HAVING A ROUGHENED, DRUSED, OR VARIEGATED APPEARANCE.
No. 344,706.  Patented June 29, 1886.
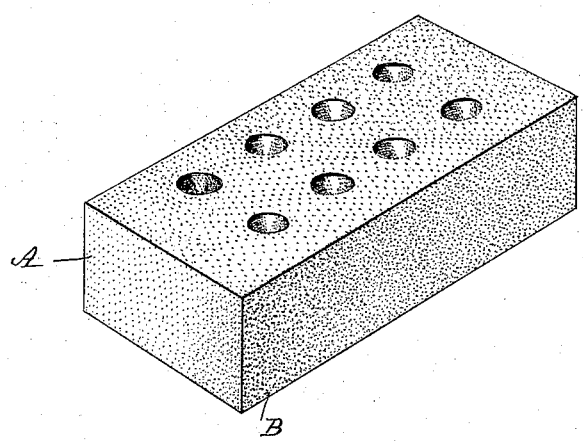
WITNESSES
Edwin L. Yewell,
W. C. Chaffee
INVENTOR
J. C. Anderson
By
L. W. Ginsabaugh
Attorney

UNITED STATES PATENT OFFICE.

JAMES C. ANDERSON, OF HIGHLAND PARK, ILLINOIS.

BRICK OR TILE HAVING A ROUGHENED, DRUSED, OR VARIEGATED APPEARANCE.

SPECIFICATION forming part of Letters Patent No. 344,706, dated June 29, 1886.

Application filed November 9, 1885. Serial No. 182,183. (No model.)

*To all whom it may concern:*

Be it known that I, JAMES C. ANDERSON, a citizen of the United States, residing at Highland Park, in the county of Lake and State of Illinois, have invented certain new and useful Improvements in Bricks and Tiles, of which the following is a specification, reference being had therein to the accompanying drawing.

My invention relates to improvements in bricks and tiles, the object of my invention being to produce a brick, tile, or other like article having a roughened, drused, or variegated appearance.

My invention therefore consists in mixing fluor-spar or analogous material in a finely-divided or pulverized state with the clay and making the bricks or tiles therefrom.

In the drawing I have shown a brick in perspective view made in accordance with my invention.

A indicates the main body of the brick, which is made of clay; and B indicates the particles of fluor-spar which appear on the surface of the brick.

In carrying out my invention, I take the ordinary clay used for making red brick and reduce it to a powdered or finely-disintegrated condition in a dry state, or into the condition as now practiced in making fine brick under the dry-clay process, to which I add powdered or semi-powdered fluor-spar or similar material, and mix the same intimately with the powdered clay. I prefer to use about thirty parts of clay to one of the powdered fluor-spar; but the quantity may be varied to suit the various combinations and colors desired. The clay thus prepared and combined with the fluor-spar is pressed into the desired form and burned in the usual manner, when it will be found that the clay part of the brick has somewhat shrunken and assumed the red color, while the fluor-spar will appear in semi-vitreous whitish spots or freckles, raised or standing out from the surface of the brick, having a speckled and drusy appearance.

I do not wish to be understood as limiting myself to the union of clay and fluor-spar in the manufacture of bricks, tiles, &c., but may use any of the "spars" or metallic oxides, which do not shrink in the same degree, as the clay when burned will produce articles having a roughened or drused surface. Neither do I limit myself to the use of clay which, when burned, assumes a red color, for it is a well-known fact that clays in different locations burn different colors. It is also a well-known fact that fluor-spar and other spars have different colors, so that in using a clay which will burn a light color I may use a spar of a dark color, and so form a contrast, or change the colors, so as to produce a brick of a very ornamental character.

Having thus described my invention, what I claim, and desire to secure by Letters Patent, is—

1. A brick or tile composed of clay and fluor-spar, in substantially the proportions described and set forth.

2. As a new article of manufacture, a brick having the main body of the color of the clay when burned and a roughened or drused surface, as set forth.

In testimony whereof I affix my signature in presence of two witnesses.

J. C. ANDERSON.

Witnesses:
 FRANK L. BLAKE,
 LOUISE S. PRUYN.